United States Patent Office 3,513,942
Patented May 26, 1970

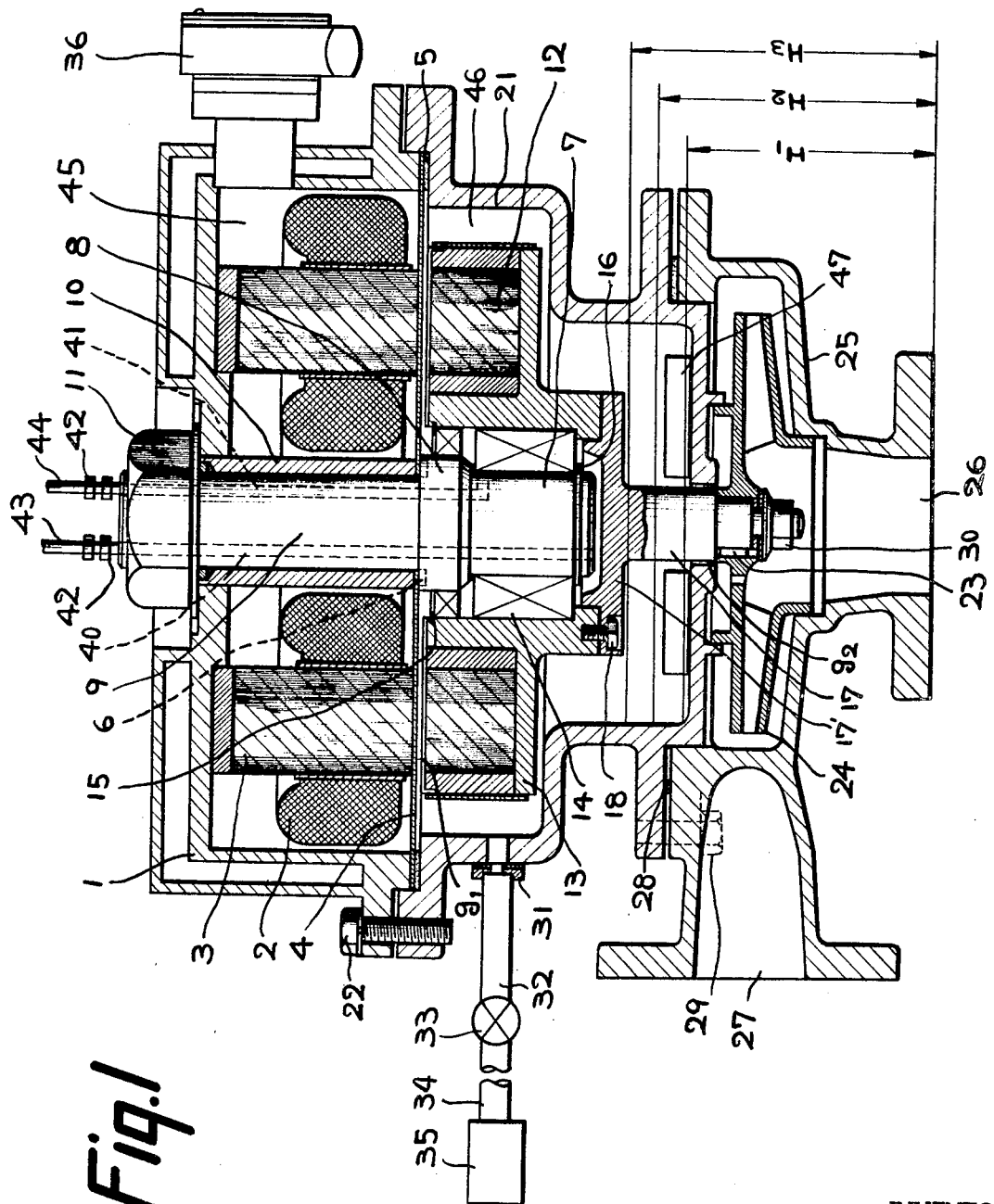

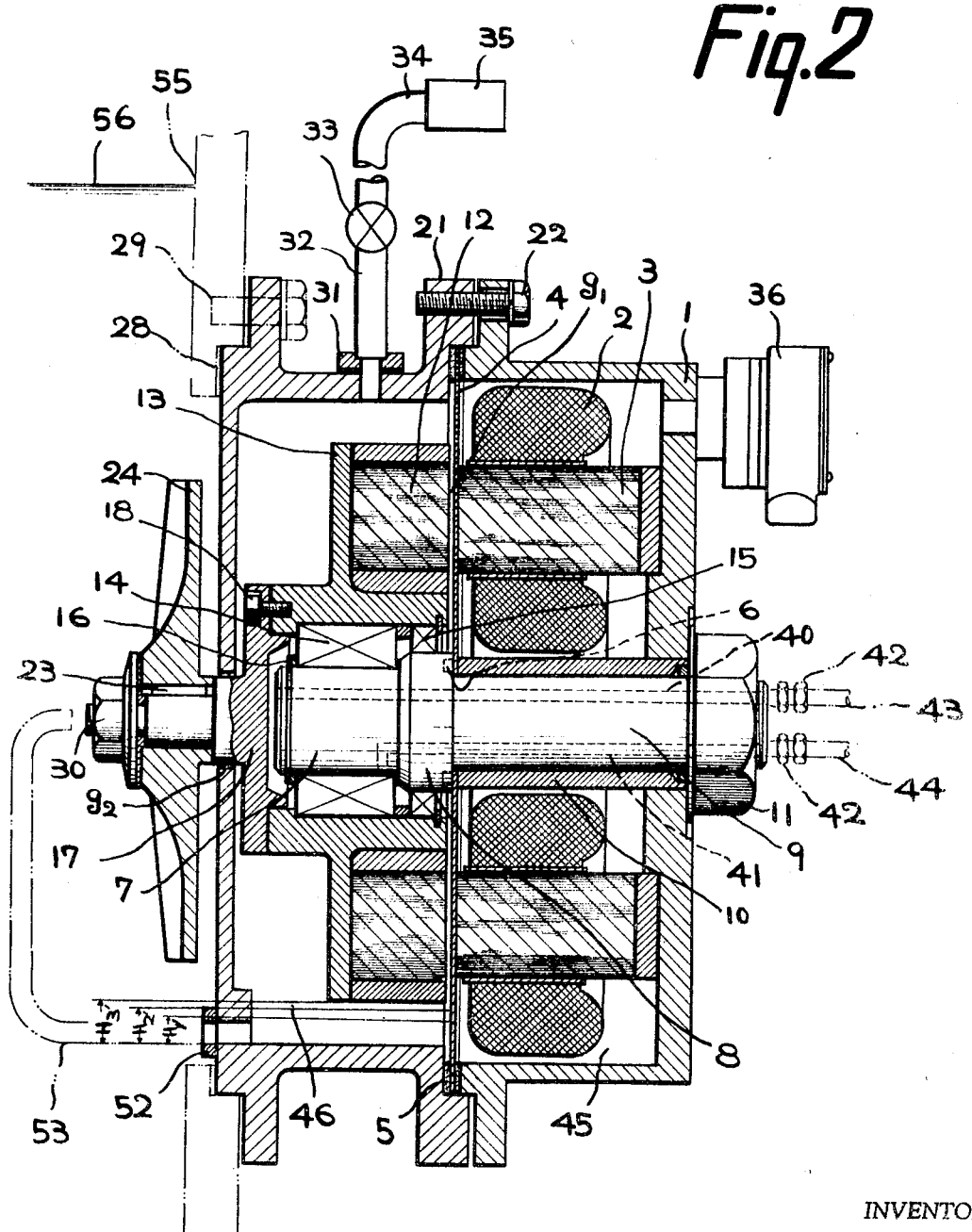

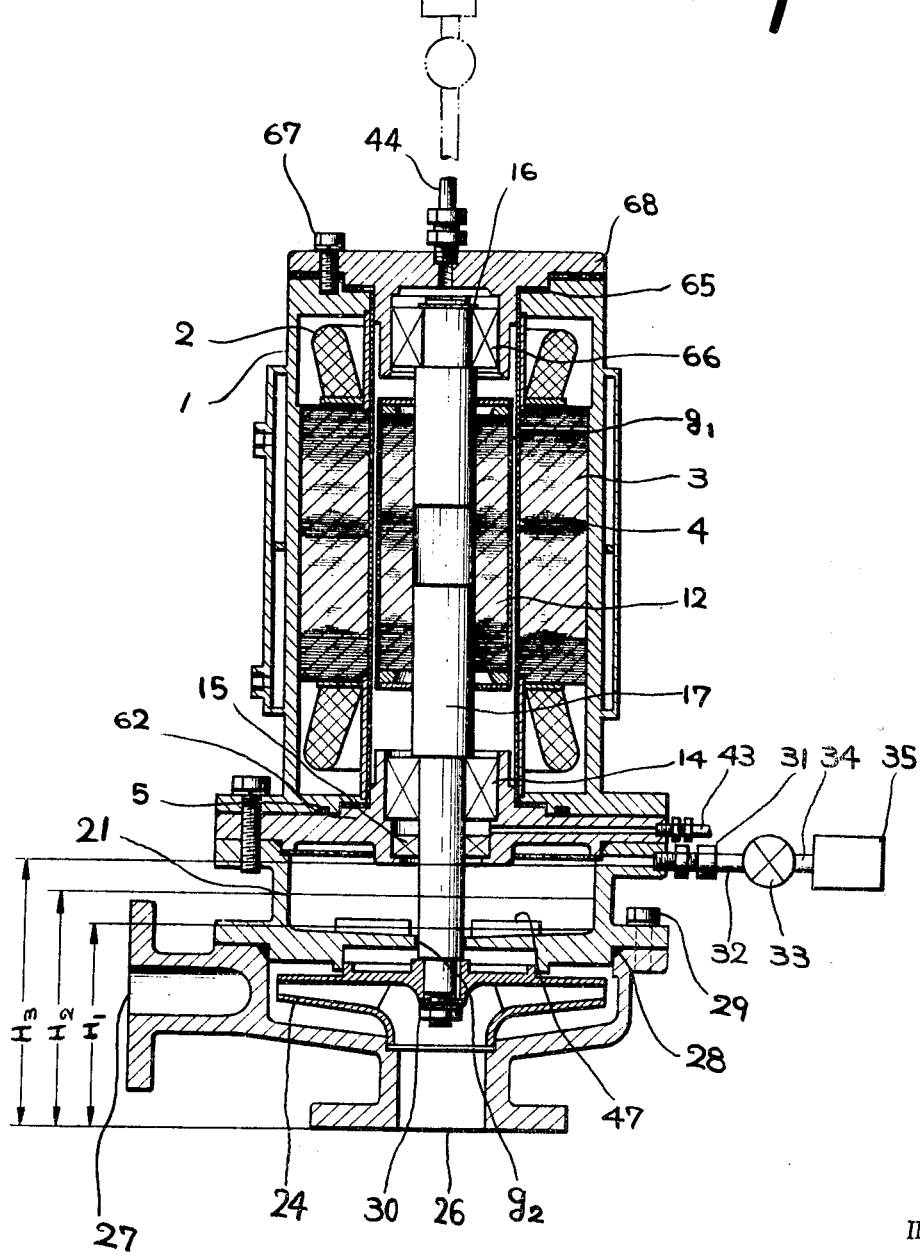

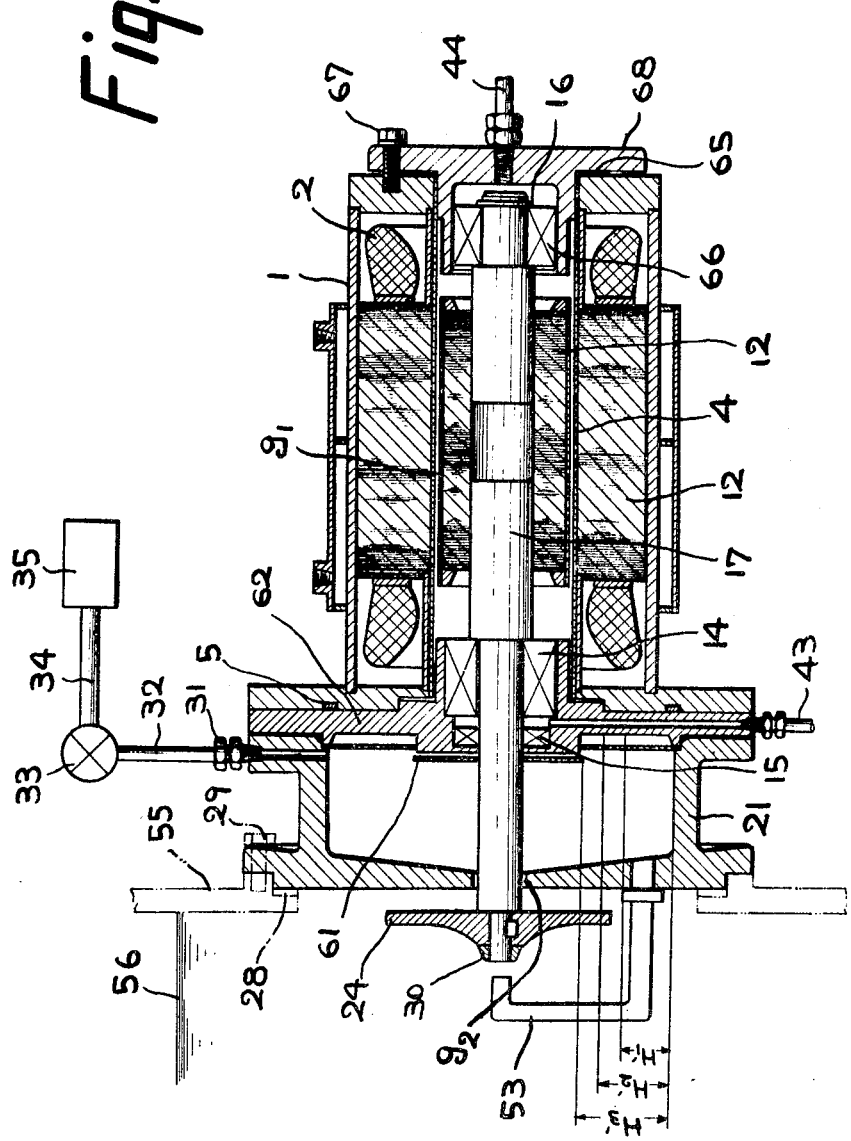

3,513,942
DEVICE FOR LUBRICATING A BEARING FOR USE IN A CANNED MOTOR PUMP AND AN AGITATOR
Tetsuya Sato, Ibo-gun, Hyogo, Japan, assignor to Kabushiki Kaisha Teikoku Denki Seisakusho, Osaka, Japan
Filed Nov. 27, 1967, Ser. No. 685,856
Int. Cl. F04d 29/06; F16n 1/00
U.S. Cl. 184—6                                                4 Claims

ABSTRACT OF THE DISCLOSURE

A device for lubricating a bearing for use in a canned motor pump and an agitator comprising a rotary shaft connected to an impeller, a bearing supporting rotatable said rotary shaft, a lubricating liquid fed to said bearing, a high pressure gas chamber containing said bearing, a high pressure gas source in communication with said gas chamber, whereby the pressure gas in said gas chamber is effected to maintain the level of a handled liquids below the level of the bearing portion.

---

This invention relates to devices for lubricating a bearing, and in particular to a device for lubricating a bearing for use in a canned motor pump and a canned motor agitator which handles liquids containing slurry or liable to form deposits.

Pumps of the prior art for use in petroleum, chemical, food, shipping and atomic industries have had disadvantages set forth hereunder when the liquids handled by the pumps are of special variety which contains slurry (solid fine particles) or is liable to form deposits, or are metals in liquid form. If the pumps used for handling liquids of the type described are provided with a conventional packing or the so-called gland packing for providing a seal to the bearing portion, slurry will find its way into the gland while the pump is in operation, causing premature wear and tear to the gland packing and the sliding portion of the shaft. The crystallizable fluid leaking out through the gland will form deposits on the packing and shaft upon exposure to atmosphere, leading also to abnormal wear and tear of these parts. Pumps in which a seal is provided by a metal in liquid form also have disadvantages because measures have to be taken to reduce leaks to substantially zero.

In the case of pumps in which a seal is provided mechanically, if a liquid of special variety as described above finds its way into the fixed and rotary sliding surfaces which provide seal to the pumped liquid, the sealing capacity of the pumps will rapidly deteriorate, making the pumps unfit for practical use. Various devices have been made and use to prevent the leak of pumped liquid by using expensive hard metals or a double mechanical seal. No satisfactory solution has been found, however, to the problem of preventing pumps from becoming useless because of the leak of fluid.

Pumps which are completely leak-proof or the so-called canned motor pumps are constructed such that the pump and the motor are formed integrally, with the impeller of the pump and the rotor of the electric motor for operating the pump rotating in the pumped liquid. The canned motor pumps have no glands, and a seal is provided to the pumped liquid solely by means of gaskets. Thus, the canned motor pumps can be made essentially leak-proof by virtue of their construction. This leak-proof feature makes pumps of this type more reliable than pumps of the gland packing or mechanical seal type described above in handling expensive liquids, harmful liquids or liquids which should be kept germ-free. Since, however, the rotary bearing portion of the pumps of this type is lubricated by the pumped liquid itself, the handling of liquids of the special type described above will cause abnormal wear and tear of the bearing and shaft which will inevitably lead to shutting off of the pumps. Proposals have, therefore, been made to apply a clean liquid to the bearing portion of the canned motor pump from outside. However, this system has been unable to completely prevent wear and tear of the bearing portion due to the liquids of special variety infiltrating the clean liquid by diffusion. When the special liquids are metals in liquid form which have a high specific gravity or viscosity, frictional losses are markedly increased by the fact that the rotor of the electric motor rotates in the pumped liquid, thereby reducing the over-all efficiency of the pumps. Thus, no satisfactory solution has ever been provided to the problems of how to lengthen their service life and increase efficiency.

Accordingly, an object of the present invention is to provide a device for lubricating a bearing of a canned motor pump or a canned motor agitatior of the completely leak-proof type which can obviate the problems involved in the operation of such pump or agitator as described above.

Another object of the invention is to provide a device for lubricating a bearing of a canned motor pump or a canned motor agitator in which said bearing is lubricated by a lubricant which is different from the pumped liquid or the liquid to be agitated by the agitator.

Still another object of the invention is to provide a device for lubricating a bearing of a canned motor pump or a canned motor agitator which includes a high pressure gas chamber for maintaining the level of the pumped liquid to be agitated below the level of the bearing portion.

Other objects and advantages of the invention will become apparent from consideration of the description set forth hereunder when taken in conjunction with the accompanying drawing illustrating embodiments of the invention, in which:

FIGS. 1 and 2 are longitudinal sectional views of a pump and an agitator respectively which are each provided with an axial air gap type induction motor and which incorporate the bearing lubrication device according to this invention; and FIGS. 3 and 4 are longitudinal sectional views of a pump and an agitator respectively which are each provided with a radial air gap type induction motor and which incorporate the bearing lubrication device according to this invention.

The pump shown in FIG. 1 is provided with an axial air gap type induction motor. 1 is a frame for the electric motor which houses stator iron cores 3 each provided with a stator winding 2. 4 is a partition plate formed of an anti-corrosive sheet metal for separating a motor stator housing 45 from a gas chamber 46 and providing an airtight seal thereto together with gaskets 5 and 6. The gasket 6 is mounted between a flange 8 of a fixed shaft 7 and said partition plate 4. The fixed shaft which is immovable is formed integrally with the flange 8 for bearing thrust. A portion 9 of the shaft 7 projecting rearwardly of the flange 8 extends through a center aperture in the partition plate 4 to be received in a boss 10 disposed at the center of the electric motor and sealed by said gasket 6. The rear portion 9 of the shaft 7 is fixed to the center portion of the electric motor by threadably applying a nut 11 to an externally threaded portion at the end of the rear portion 9. 12 is a rotor canned with an anti-corrosive sheet metal which is secured to a rotor frame 13 disposed such that it is spaced apart from the partition plate 4 by a magnetic gap $g_1$. In the middle of the rotor frame 13 is housed a bearing 14 which is rotatably mounted on a forward portion of the fixed shaft 7. The bearing may be a roller ball bearing or a plain bearing. 15 is a bearing sealing portion such as a labyrinth, lip seal or mechanical seal, for example, which provides a seal to the bearing chamber. 16 is a retaining ring secured to the front end of the forward portion of the fixed shaft 7 for limiting the axial movement of the bearing 14. 17 is a driving shaft formed integrally with a uange 17′ which is secured by a mounting screw 18 on the central end portion of the rotor frame 13 for rotation with the rotor 12 to thereby drive an impeller 24 of the pump. The rotor 12, rotor frame 13 and driving shaft 17 are disposed in part in a gas chamber 46 formed by a gas chamber frame 21 which is secured by a bolt 22 to the electric motor frame 1. The gasket 5 provides an airtight seal to the electric motor frame 1 and the gas chamber frame 21. The driving shaft 17 extends through the middle portion of a side wall of the gas chamber frame 22 with a small gap $g_2$ existing between the driving shaft 17 and the gas chamber frame. The impeller 24 of the pump, which is secured to the driving shaft 17 by a nut 30 through a key 23, is housed in a pump casing 25 formed with a suction port 26 and a discharge port 27. The pump casing 25 is secured to a side wall of a gas chamber frame 21 by a bolt 29 through a gasket 28. 31 is a union joint mounted on an outer wall of the gas chamber frame 21, and the gas chamber 46 maintains communication with a high pressure gas source 35 through a high pressure gas line 32, manually or electrically operated valve 33 which is normally closed, and high pressure gas line 34. A coolant and lubricant is supplied through a bore 40 formed in the fixed shaft 7 to cool and lubricate the bearing portion and returned through a bore 41 also formed in the shaft 7. The bores 40 and 41 are connected to pipes 43 and 44 respectively through union joints 42. 36 is a terminal box for connecting the motor to a power sourec by electric wires.

In operation, if the casing 25 is primed with a liquid, the liquid woll try to pump up and invade, through the gap $g_2$, the gas chamber 46 which is initially filled with gas. When the liquid level has reached $H_2$, the gas in the gas chamber 46 is compressed to maintain balance with the liquid. If the pump is electrically connected to the power source and begins operation, the pressure of liquid invading the gas chamber 46 will be lowered as the operation of pump progresses, so that the level of liquid in the gas chamber will be lowered from $H_2$ to $H_1$ to maintain balance with the pressure of sealing gas. A plurality of baffle plates 47 are mounted radially on an inner side surface of the gas chamber 46 to prevent the invading liquid from flowing in a circular current, in order that the invading liquid may not be energized by the rotation of driving shaft 17 and form a turbulent flow, thereby causing the gas to leak through the gap $g_2$. The frame 21 of gas chamber 46 is designed and constructed such that the liquid level is below $H_3$ which corresponds to the level of flange of the driving shaft when the casing 25 is primed with a liquid, and that the liquid level is lowered to above $H_1$ which corresponds to the level of the inner side surface of the frame 21. With this arrangement, the operation of pump can be commenced and stopped without the rotor 12 and the rotor frame 13 being imemrsed in the pumped liquid. Accordingly, it will be understood from the description of the construction made previously that the bearing 14 and the forward portion of the fixed shaft 7 by which the bearing is supported can be kept out of contact with the pumped liquid while the pump is in operation. It will thus be evident that the fact that the bearing and the portion of the shaft that supports the bearing are not in contact with the pumped liquid constitutes a very important advantage in handling liquids of the special variety described previously. The bearing portion will have longer service life because it is free from wear and tear to be caused by the special liquids. The overall efficiency of the pumping operation will be greatly increased, for the disadvantage of conventional canned motor pumps of frictional losses caused by the rotor rotating in the special liquids (especially the liquids of a high specific gravity or viscosity) can substantially be eliminated. In addition to the aforementioned advantages, the canned motor pump according to this invention is completely leak-proof like the conventional canned motor pumps, for the parts of the pump which are brought into contact with the liquid and the parts of the pump used for gas sealing are all made of an anti-corrosive material.

If, in actual operation, the properties of special liquids to be handled or the properties of gas used are such that part of the gas is dissolved in the liquid through the $H_1$ level, the liquid level will gradually rise. In such a case, a liquid level detector of the proper type is provided whereby the valve 33 is operated either electrically or manually in accordance with a change in the liquid level to supply gas from the high pressure gas source 35 to the gas chamber 46 through the lines 32 and 34, thereby lowering the liquid level to $H_1$.

FIG. 2 shows a completely leak-proof canned motor agitator provided with an axial air gap type induction motor and incorporating the present invention. In FIG. 2, like reference characters designate parts of the agitator which function in the same manner as the parts of the pump illustrated in FIG. 1. In FIG. 2, 24 designates a turbine impeller for the agitator instead of the impeller for the pump shown in FIG. 1. 55 is a side wall of an agitating tank; 56 is a liquid level in the agitating tank; and 53 is a return liquid line.

In operation, when the agitator is electrically connected to the power source, the impeller beings to rotate and the agitation operation is commenced. Then, the liquid will invade the gas chamber through the gap $g_2$ and move through inner walls of the gas chamber frame 21 to be collected on the bottom of the gas chamber. The liquid collected will be released through the liquid return line and move toward the center of the impeller which is the lowest pressure section. The liquid levels $H'_1$, $H'_2$ and $H'_3$ in this application have the same significance and operation as the liquid levels in the pump of FIG. 1. In this construction, the liquid level rises to a level near the gap $g_2$ when the agitator is not in operation, so that it is necessary to supply gas to the gas chamber from the high pressure gas source in order to lower the liquid level to $H_3$ prior to the commencement of operation. If, however, the surface of rotation of the impeller is disposed horizontally as shown in FIG. 1 instead of vertically as illustrated in FIG. 2, the agitator can be operated in exactly the same manner as the pump shown in FIG. 1. The liquid return pipe can, of course, be eliminated.

FIG. 3 shows a canned motor pump provided with a conventional radial air gap type induction motor and incorporating the present invention. In FIG. 3, like reference characters designate parts of the pump which function in the same manner as the parts of pump shown in FIG. 1. In the pump illustrated in FIG. 3, the partition plate 4 is in cylindrical form and the rotor 12 transmits power to the impeller driving shaft 17 which is supported by the fixed stationary bearings 14 and 66 as conventional canned motor pumps. What distinguishes the pump of FIG. 3 from the pump of FIG. 1 is the fact that the rotor 12 is disposed in the passage of a lubricating and cooling agent which enters through the pipe 43 and exits through the pipe 44 as shown in FIG. 3. The pump of FIG. 3 uses water or other liquids of low specific gravity to minimize frictional losses caused by the rotation of the disk in the liquid.

In FIG. 4 is illustrated an agitator which incorporates the pump of the construction shown in FIG. 3. The agitator illustrated in FIG. 4 operates in the same manner as the agitator shown in FIG. 2.

From the foregoing description, it will be appreciated that the present invention provides a device for lubricating a bearing of a canned motor pump or a canned motor agitator in which a lubricating and cooling agent different from the pumped liquid is used for the bearing, and the rotor and the bearing portion of the electric motor are sealed by means of gas and kept out of contact with the pumped liquid. The device according to this invention can thus prevent wear and tear of the bearing to be caused by liquids containing slurry or causing deposits, liquids of high specific gravity such as metals in liquid form, for example, or liquids of high viscosity such as oils, for example. Moreover, the device according to this invention permits to operate the pump or agitator at an increased overall efficiency and at the same time keep the pump or agitator completely leak-proof.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

What I claim is:

1. A device for lubricating a bearing for use in a canned motor pump and an agitator which handles liquids containing slurry and liable to form deposits comprising a rotary shaft connected to an impeller, a bearing rotatably supporting said rotary shaft, a lubricating liquid fed to said bearing, a high pressure gas chamber in which is located a bearing chamber containing said bearing, a high pressure gas source in communication with said gas chamber, a bearing sealing means around said shaft which seals the bearing chamber and serves both to limit the quantity of lubricant finding its way into the gas chamber in the form of leakage to a given level and to prevent leakage of the sealing gas from the gas chamber into the lubricating liquid in the bearing chamber, a partition wall provided between said gas chamber and a chamber including said impeller, and an axial hole provided on said partition wall through which the rotary shaft is protruded, whereby the pressure gas in said gas chamber is effected to maintain the level of the handled liquids below the level of the bearing portion.

2. The device for lubricating a bearing for use in a canned motor pump and an agitator as claimed in claim 1, wherein a plurality of baffle plates are mounted radially on said partition wall in said gas chamber to prevent the invading liquid from flowing in a circular current.

3. The device as claimed in claim 1, in which said motor is an axial air gap type induction motor.

4. The device as claimed in claim 1, wherein said motor is a radial air gap type induction motor.

References Cited

UNITED STATES PATENTS

| | | | |
|---|---|---|---|
| 2,959,133 | 11/1960 | Erwin | 103—111 XR |
| 2,992,618 | 7/1961 | Means | 103—111 XR |
| 3,157,128 | 11/1964 | Hustinx | 103—111 XR |
| 3,248,880 | 5/1966 | Hull et al. | |
| 3,339,491 | 9/1967 | Malloch et al. | 103—111 |

FOREIGN PATENTS

| | | |
|---|---|---|
| 1,138,519 | 1/1957 | France. |

ROBERT A. O'LEARY, Primary Examiner

M. A. ANTONAKAS, Assistant Examiner

U.S. Cl. X.R.

103—111; 253—39